Feb. 22, 1966   H. L. THOMPSON   3,236,233
TRUSS DEVICE
Filed Jan. 21, 1964
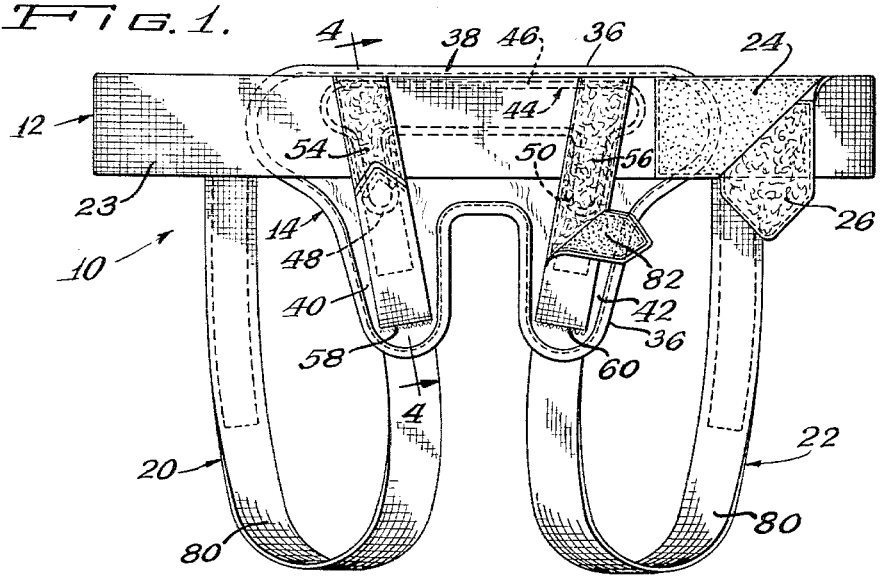
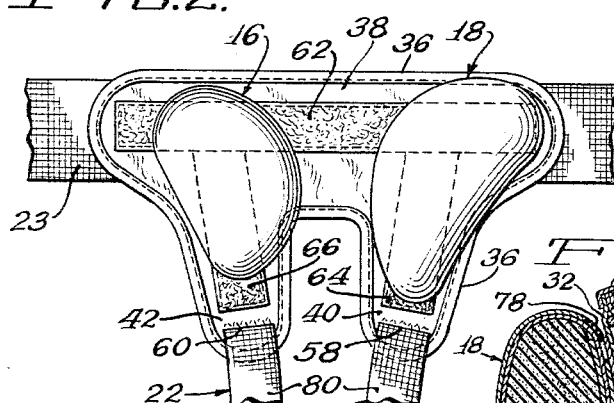
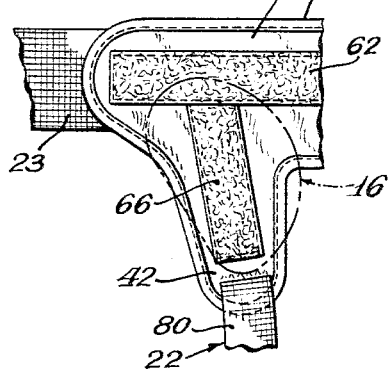
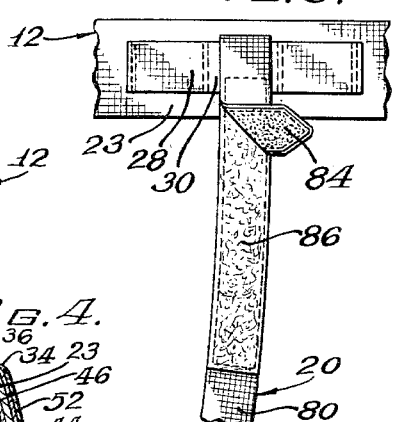
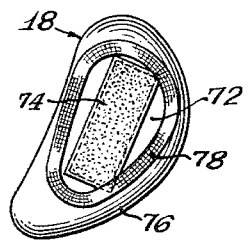
Inventor:
Harry L. Thompson
By
Atty.

United States Patent Office 3,236,233
Patented Feb. 22, 1966

3,236,233
TRUSS DEVICE
Harry L. Thompson, Marshall, Mich., assignor to Brooks Appliance Company, Inc., Marshall, Mich., a corporation of Michigan
Filed Jan. 21, 1964, Ser. No. 339,153
5 Claims. (Cl. 128—107)

This invention relates to truss devices for personal wear. More particularly, the invention relates to a truss device embodying filamentary fastening means for adjustably fastening components of the device together.

Trusses for personal wear, such as trusses worn for the retention or reduction of hernias and other protrusions of the body, conventionally are made of several components that are fastened together by hooks, buckles, snap fasteners and the like. The adjustability of the devices employing such fasteners is limited, and they are lacking in convenience. Furthermore, the fasteners may represent a source of irritation or discomfort, make the devices bulkier, or interfere with other articles of wear.

An important object of the present invention is to provide a truss device which overcomes the problems of prior devices and provides advantages thereover. A particular object is to provide a truss device in which the component parts are fastened together by filamentary fastening means, thereby providing a wide range of adjustability and increased convenience. The new truss device is comfortable and free of protruding fastening members, and it does not interfere with other articles of wear.

Another particular object is to provide a truss device having a supporting structure and one or more body support pads, wherein filamentary fastening means are provided for removably mounting the pads on the supporting structure in any of numerous positions thereon. An accompanying object is to provide such a device including filamentary fastening means for similarly joining together components of the supporting structure.

An additional object is to provide a truss device accomplishing the foregoing objects and which also includes means for pressing the support pads against the body with the desired pressure.

A further object is to provide a truss device which is simple and economical, and which is well adapted for being kept clean and sanitary.

These and other objects, advantages and functions of the invention will be apparent on reference to the specification and to the accompanying drawings illustrating a preferred embodiment of the invention, wherein like parts are identified by like reference symbols in each of the views, and wherein:

FIGURE 1 is a front elevational view of a truss device constructed according to the invention, with fastening components thereof partly separated for purposes of illustration;

FIG. 2 is a fragmentary rear elevational view of the front portion of the device, showing a pad holder and pads mounted thereon, as they face the body;

FIG. 3 is a fragmentary view similar to FIG. 2, illustrating a different position of a pad on the pad holder;

FIG. 4 is a fragmentary cross-sectional view of the device, taken on line 4—4 of FIG. 1;

FIG. 5 is a fragmentary rear elevational view of the device, showing one end of an underband attached to a bodyband with fastening components partly separated for purposes of illustration; and FIG. 6 is a bottom plan view of one of the pads.

In its preferred embodiments, the new truss device of the invention includes a supporting structure which may be worn on the body, and one or more support pads to be held against the body by the supporting structure. Mat surfaces comprising a multiplicity of small bent filaments are provided on the supporting structure and the pad, respectively. The filaments of each surface are releasably interengageable with the filaments of the remaining surface to interengage the surfaces when pressed together. The pad thereby is removably mountable on the supporting structure by pressing the mat surfaces together to interengage the surfaces, and the pad is mountable in any desired relative positions of the interengaged surfaces. Preferably, the supporting structure includes additional filamentary mat surfaces for adjustably fastening its component parts together.

Referring to the drawings, a preferred embodiment of a truss device or appliance 10 includes a bodyband 12, a pad holder 14 carried by the bodyband, a pair of support or pressure pads 16 and 18 mounted on the pad holder, and a pair of underbands or perineal bands 20 and 22 joined to the bodyband and to the pad holder. The bodyband, the pad holder, and the underbands provide a supporting structure for the pads, and the structure serves to hold and press the pads against the body for the retention or reduction of hernias and ruptures.

The bodyband 12 includes a relatively wide elongated flexible belt 23 constructed of longitudinally elastic material. Strips 24 and 26 of filamentary fabric material are stitched or otherwise secured to the belt at its opposite ends and on opposite sides thereof. The fabrics are of two types, and they have filamentary mat surfaces which interengage each other for interengaging the ends of the belt when overlapped, as described subsequently in greater detail. The normally rear side of the belt is provided with a pair of underband holding strips 28, one of which is illustrated in FIG. 5. The strips are spaced apart longitudinally on the belt. Each strip is stitched or otherwise secured to the outer side of the belt, leaving a central loop 30. One end of each of the underbands 20 and 22 is attached to one of the loops, as subsequently described.

The pad holder 14 is constructed of inner and outer cloth fabric layers 32 and 34 joined together around their peripheries by a strip of binding tape 36 stitched thereto. The holder and the cloth fabric layers thereof have a yoke configuration. The holder includes a normally horizontal upper portion 38 and longitudinally spaced depending portions 40 and 42 adjacent opposite ends thereof. The cloth fabric layers together form a yoke-shaped pocket, and a stiff backing member 44 is received in the pocket. The backing member includes an upper portion 46 which is curved inwardly to conform to the curvature around the body and forms a part of the upper portion 38 of the holder. The backing member also includes a pair of depending portions 48 and 50 adjacent its ends. The depending portions are curved downwardly and inwardly to conform to the body, and they constitute parts of the respective depending portions 40 and 42 of the holder. The inner cloth fabric layer 32 has a soft outer surface facing the body. The backing member 44 is a substantially rigid one-piece structure formed of a bent wire or other suitable material.

A pair of belt loops 52 (FIG. 4) are stitched to the upper portion of outer fabric layer 34 in longitudinally spaced apart relation. The pad holder 14 is supported on the bodyband 12 by inserting the belt 23 thereof through the belt loops. Strips of filamentary fabric 54 and 56 are stitched respectively on the outer surfaces of the belt loops. The fabric strips extend downwardly on the depending holder portions 40 and 42 and are stitched on the outer cloth fabric layer 34. Slots 58 and 60 are formed in the respective depending holder portions below the fabric strips 54 and 56. The slots extend through both cloth fabric layers 32 and 34, so that the underbands 20 and 22 may be inserted through the holder. The ends of the underbands are engaged with the filamentary fabric strips 54 and 56, as subsequently described.

Three filamentary fabric strips 62, 64 and 66 are stitched on the inner cloth fabric layer 32 in a yoke configuration. An upper horizontal fabric strip 62 forms part of the upper portion 36 of the holder 14, and the strip is adjacent to the upper portion 46 of the backing member 44. Depending fabric strips 64 and 66 form parts of the depending portions 40 and 42 of the holder, and the strips are adjacent to the depending portions 48 and 50 of the backing member. The filamentary fabric strips are provided for mounting the pads 16 and 18, or other pads, on the inner surface of the holder facing the body.

Support pads 16 and 18 of different sizes and shapes are shown for purposes of illustration, and other sizes and shapes may be provided. The outer parts of the pads may be curved, flat, or both curved and flat, to conform to the configuration of the body and provide the desired contact therewith. The pads preferably have the same basic construction, as represented by the construction of the pad 18 in FIGS. 4 and 6. The pad 18 includes a base 68 of relatively stiff sheet material, and a contoured body 70 thereon formed of sponge or foam rubber, or other preferably resilient material. The base and the body are enclosed by a covering layer 72 of soft cloth fabric. A strip of filamentary fabric 74 is stitched on the outer surface of the covering layer on the base 68.

A pad cover 76 is formed of a piece of washable soft cloth fabric, and it is bordered by an elastic strip 78. The strip is shorter than the peripheral dimension of the cover fabric, so that the margin is drawn together by the elastic to form the cover. The cover is placed over the body 70 and overlaps the base 68 somewhat, while leaving the filamentary fabric strip 74 exposed, as seen in FIG. 6. The filamentary fabric strip engages one of the filamentary fabric strips 62, 64 and 66 of the holder for removably and adjustably mounting the pad thereon.

Referring to FIGS. 1, 4 and 5, the underbands 20 and 22 are constructed identically. Each includes a relatively narrow elongated flexible strap 80 constructed of longitudinally elastic material. Like filamentary fabric strips 82 and 84 are stitched to opposite ends and on opposite sides of each strap. An intermediate filamentary fabric strip 86 is stitched to each strap near one end thereof. The intermediate strip is longitudinally displaced inwardly from the end strip 84 at that end on the same side of the strap. The two strips interengage each other, so that the end of the strap may be bent back on itself and a secure loop formed thereat, as illustrated in FIG. 5. The strap end is joined to the bodyband 12 by inserting the end between one of the holding strip loops 30 and the belt 23, bending the end back over the loop, and engaging the end and intermediate strips 84 and 86 in the manner illustrated. The opposite end of the strap is inserted through one of the slots 58 and 60 in the depending holder portions 40 and 42. The fabric strip 82 on the end is engaged with one of the outer fabric strips 54 and 56 on the holder.

In the preferred illustrative embodiments, each filamentary fabric is a pile fabric containing a multiplicity of raised pile filaments or threads projecting from a foundation fabric strip to form an outer mat surface. The filaments are formed of synthetic thermoplastic resin material, and they have a bent or curled configuration. Two types of mat surfaces are employed on respective fabrics, and the surfaces interengage or mate with each other. The filaments of one type of surface are formed as outwardly projecting hooks. Preferably, the hooks are relatively stiff and are substantially coextensive. The hooks are produced by forming closely spaced rows of outwardly projecting loops, and cutting one side of each loop near its outer end to produce rows of hooks. The filaments of the other type of surface are formed as a mass of outwardly projecting random loops providing an approximately uniform pile thickness. Preferably, the loops are relatively flexible and soft to the touch. When the two mat surfaces are pressed together, the multiple hooks of the first type engage the multiple loops of the second type, and the fabrics are joined together in a manner which resists relative longitudinal displacement of the fabrics. At the same time, the fabrics may be separated by peeling the mat surfaces apart. The mat surfaces may be interengaged in any desired relative positions or orientations of the surfaces and of the fabrics.

Filamentary fabrics having interengaging or mating surfaces of the foregoing types are commercially available, one product being identified by the trademark "Valcro". If desired, other filamentary fabrics having interengaging surfaces may be employed, it being preferred that the filaments of at least one of the surfaces be formed as outwardly projecting hooks. For example, suitable fabrics are described in U.S. Patent No. 2,820,277. Each of the fabrics is provided with pile filaments of substantially equal length which are bent in random directions at their tips to form hooks.

The filamentary fabrics strips of the truss device 10 which have surfaces formed of hook-shaped filaments include the bodyband end strip 24, the pad strips 74, and the underband end strips 82 and 84. The fabric strips which have mating surfaces formed of looped filaments include the bodyband end strip 26, the outer holder strips 54 and 56, the inner holder strips 62, 64 and 66, and the underband intermediate strips 86. The surfaces having hooks interengage surfaces having loops on the same or different components of the device.

The pad holder 14 of the illustrative embodiment of the truss device 10 is disposed over the lower adbominal regions of the body in use. The upper holder portion 38 is disposed over the central abdominal region, and the depending holder portions 40 and 42 are disposed over the groin regions. An important feature of the invention is that one or more support pads may be located precisely to provide the necessary support and maximum comfort. The pads may be mounted on the holder in any desired relative positions of the interengaged pad and holder mat surfaces, so that the pads may be shifted about and turned to any desired extent.

The support pads 16 and 18 are arranged on the inner surface of the pad holder 14, with the filamentary fabric strips 74 of the pads arranged on the mating fabric strips 62, 64 and 66 of the holder. The pads and the holder are pressed together, to thereby press the strips and their mat surfaces together and interengage them. The pads remain in position until the fabric strips thereof are peeled from the holder strips. The pads may be placed in any desired relative positions with respect to the holder, so long as the respective filamentary surfaces are interengaged. For example, one arrangement of the pads is illustrated in FIG. 2. In FIG. 3, the pad 16 is illustrated in a different position, having been shifted downwardly on the holder. If desired, either pad may be employed alone, on either of the holder depending portions 40 and 42. Alternatively, a pad may be mounted centrally on the upper holder portion 38. In such case, a different type of pad may be employed, which conforms to the central abdominal region.

The truss device 10 is assembled on the wearer by placing the bodyband 12 around the hips, and pressing the mating filamentary fabric strips 24 and 26 at the ends of the belt 23 together in overlapping relation. The circumference of the bodyband may be adjusted precisely for proper mounting of the device and greatest comfort. The underbands 20 and 22 are secured to the back of the bodyband in the manner illustrated in FIG. 5, by looping the ends of the underbands over the holding strip loops 30 and pressing the mating filamentary fabric strips 84 and 86 on the underbands together. The underbands are passed between the thighs, and their opposite ends are passed through the holder slots 58 and 60 from inside to outside, as seen in FIG. 1. The underbands are tightened to the desired extent, and their filamentary fabric end strips 82 are pressed on the respective mating outer filamentary fabric strips 54 and 56 of the holder. The underband adjustment also may be very precise to provide the desired support and comfort. The underbands may be adjusted at either end.

The supporting structure holds the pads 16 and 18, or other pad or pads, firmly in place. The bodyband 12 supports and exerts pressure on the upper holder portion 38. The underbands 20 and 22 support and exert pressure on the depending holder portions 40 and 42. The backing member 44 under the tension of the bodyband and underbands exerts inward and upward pressure on the pads 16 and 18 to retain the hernia or hernias.

The inner surfaces of the truss device 10 provide maximum comfort in contact with the body. There are no hooks, buckles, or snaps to contact the body, and the only fastening members which might come in contact are the filamentary fabric strips 62, 64 and 66 on the holder. The mat surfaces of the strips are relatively soft, so that any contact is unobjectionable.

The truss device is constructed for conveniently keeping it clean and sanitary. The pad covers 76 may be removed and washed frequently. The pads may be removed from the holder by separating their interengaged mat surfaces. The complete supporting structure may be washed at one time, or the components may be separated prior to washing. In the latter case, the several interengaged mat surfaces are separated, the ends of the underbands 20 and 22 are pulled through the holding strip loops 30 and holder slots 58 and 60, and the bodyband 12 is pulled through the belt loops 52.

While the invention has been illustrated as applied to a truss worn by the retention or reduction of hernias, it also is applicable to trusses worn for the retention or reduction of other protrusions of the body. For example, hemorrhoid trusses similarly include a supporting structure and a pad supported thereby. The pad may be removably and adjustably mounted on the structure, and the components of the structure may be adjustably fastened together as described for the similar parts of the hernia truss.

The invention thus provides a very useful, versatile and adaptable truss device having a wide range of adjustability. The device is convenient and comfortable. It is also simple, economical, and well adapted for being kept clean and sanitary.

It will be apparent that various changes and modifications may be made in the construction and arrangement of the components of the new truss device within the spirit and scope of the invention. It is intended that such changes and modifications be included within the scope of the appended claims.

I claim:

1. In a truss device including a supporting structure which may be worn on the body and a support pad to be held against the body by the supporting structure, said supporting structure comprising a bodyband, one or more underbands, a pad holder carried by said bodyband having portions disposed over the lower abdominal regions of the body in use, the combination of mat surfaces comprising a multiplicity of small bent filaments on said supporting structure and said pad respectively, said filaments of each surface being releasably interengageable with the filaments of the remaining surface to interengage the surfaces when pressed together, said pad thereby being removably mountable on said supporting structure by pressing said mat surfaces together to interengage the surfaces and being mountable in any desired relative positions of the interengaged surfaces.

2. In a truss device including a supporting structure which may be worn on the body and a support pad to be held against the body by the supporting structure, said supporting structure comprising a bodyband, one or more underbands, a pad holder carried by said bodyband having portions disposed over the lower abdominal regions of the body in use, the combination of mat surfaces comprising a multiplicity of small filaments on said supporting structure and said pad respectively, said filaments of one of said surfaces comprising outwardly projecting hooks, said filaments of the remaining one of said surfaces comprising outwardly projecting loops, said filaments of each surface being releasably interengageable with the filaments of the remaining surface to interengage the surfaces when pressed together, said pad thereby being removably mountable on said supporting structure by pressing said mat surfaces together to interengage the surfaces and being mountable in any desired relative positions of the interengaged surfaces.

3. In a truss device including a bodyband, a pad holder of yoke configuration carried by the bodyband and having portions disposed over the lower abdominal regions of the body in use, said holder portions including an upper portion disposed over the central abdominal region and depending portions disposed over the groin regions, and at least one support pad to be held against an abdominal region by the holder, the combination of mat surfaces comprising a multiplicity of small bent filaments on said holder portions and said pad respectively, said filaments of at least one of the respective holder portion and pad surfaces comprising outwardly projecting hooks, said holder portion filaments being releasably interengageable with said pad filaments to interengage a holder portion surface and the pad surface when pressed together, said pad thereby being removably mountable on one of said holder portions by pressing their respective mat surfaces together to interengage the surfaces and being mountable in any desired relative positions of the interengaged surfaces.

4. A truss device as defined in claim 3 wherein said pad holder comprises a fabric pocket suitable for contact with the body, and a stiff backing member of yoke configuration received in said pocket and curved to conform to the configuration of the body in said abdominal regions, whereby said backing member exerts inward pressure on said at least one pad and also exerts upward pressure on said pad when mounted on a depending portion of said holder.

5. In a truss device including a bodyband, a pair of underbands, a pad holder of yoke configuration carried by the bodyband and having portions disposed over the lower abdominal regions of the body in use, said holder portions including an upper portion disposed over the central abdominal region and depending portions disposed over the groin regions, and at least one support pad to be held against an abdominal region by the holder, the combination of mat surfaces comprising a multiplicity of small bent filaments on said bodyband, said underbands, said holder, and said pad respectively for releasably interengaging the components of the device, said mat surfaces including mating surfaces on said bodyband adjacent opposite ends thereof for interengaging the ends, mating surfaces adjacent opposite ends of said underbands for joining the ends to said bodyband and said holder respectively, and mating surfaces on said holder portions and said pad respectively for mounting the pad on a holder portion, said filaments of one of said mating surfaces comprising outwardly projecting hooks, said filaments of the remaining one of said mating surfaces comprising outwardly projecting loops, said hook filaments being releasably interengageable with said loop filaments to interengage said mating surfaces when pressed together, whereby by pressing said mating surfaces together to interengage the surfaces, said bodyband may be adjustably secured on the body, said underbands may be adjustably joined to said bodyband and said holder respectively, and said pad may be removably mounted on one of said holder portions in any desired relative positions of the interengaged mating surfaces thereof.

References Cited by the Examiner
UNITED STATES PATENTS

| | | | |
|---|---|---|---|
| 2,654,366 | 10/1953 | Miller | 128—107 |
| 2,674,244 | 4/1954 | Brodick | 128—107 |
| 3,161,200 | 12/1964 | Brickman | 128—479 X |

ADELE M. EAGER, *Primary Examiner.*